March 1, 1955 C. S. MERTLER 2,703,358
HOT CUP
Filed Jan. 25, 1952 2 Sheets-Sheet 1

INVENTOR.
CHARLES S. MERTLER
BY
Woodling and Kroet,
attys.

March 1, 1955 C. S. MERTLER 2,703,358
HOT CUP
Filed Jan. 25, 1952 2 Sheets-Sheet 2

INVENTOR.
CHARLES S. MERTLER
BY
Woodling and Krost
Attys.

United States Patent Office 2,703,358
Patented Mar. 1, 1955

2,703,358

HOT CUP

Charles S. Mertler, Mansfield, Ohio, assignor to Stevens Manufacturing Company, Inc.

Application January 25, 1952, Serial No. 268,198

2 Claims. (Cl. 219—44)

The invention relates in general to heating containers and more particularly to double-walled vessels with an electrical heater between the walls.

An object of the invention is to produce a new type of hot cup or soup warmer of the double-walled electrically heated variety, especially one with thermostatic control.

The prior art type of soup warmer or hot cup consisted of inner and outer shells nested together and fastened only at the top which was the lip periphery of the inner shell. At this lip periphery these shells were soldered together. The typical soup warmer is about six or seven inches in height and three and one-half inches in diameter with the inner cup sufficiently smaller so that there is about one-half inch in air space between the two shells. The lower portion of the inner cup had wrapped thereabout a sheet of mica and then the electrical resistance wire was wrapped around this mica sheet in a long spiral coil. The resistance wire was then covered with a cement for electrical insulation, and the ends of the coil brought out to electrical terminals hermetically sealed in the outer shell. One type of hot cup had a 720 watt heating element and was not thermostatically controlled. Attempts to put a thermostat inside the air space or void between the two shells were unsatisfactory. The reason the thermostat in the old style hot cup was unsatisfactory was because it was found that the air temperature within the void rose faster than the temperature of the inner shell. Thus if the thermostat was set at 190 degrees, for example, the thermostat would be affected by the ambient air temperature and thus shut off the electrical current to the heater before the inner shell temperature reached 190 degrees, and this, of course, would mean that the liquid or soup temperature was even less than the temperature of the inner shell because of the time lag. The soup therefore was not sufficiently warm and the entire assembly was unsatisfactory.

Therefore it is an object of the invention to provide a thermostatic control for a hot cup.

Another object of the invention is to provide a double-walled hot cup with an electrical heater of such efficiency that it is possible to use a thermostat for control of the heat.

Another object is to provide a double-walled vessel with a metal-sheathed electrical heater in good metallic contact therewith to achieve sufficiently satisfactory heat transfer such that the inner wall of the vessel heats more rapidly than the air space between the walls. With such a design, a thermostat may be mounted in the air space and fastened to the vessel and will respond to the wall temperature rather than to the temperature of the air space.

Another object of the invention is to provide a vessel having inner and outer nested cups with a metal-sheathed heater bonded to the inner cup.

Still another object of the invention is to completely eliminate the fire hazard incident to prior art hot cups, which had no safety control of the temperature.

Other objects and fuller understanding of this invention may be had by referring to the following description and claims, taken in conjunction with the accompanying drawings in which:

Figure 1:
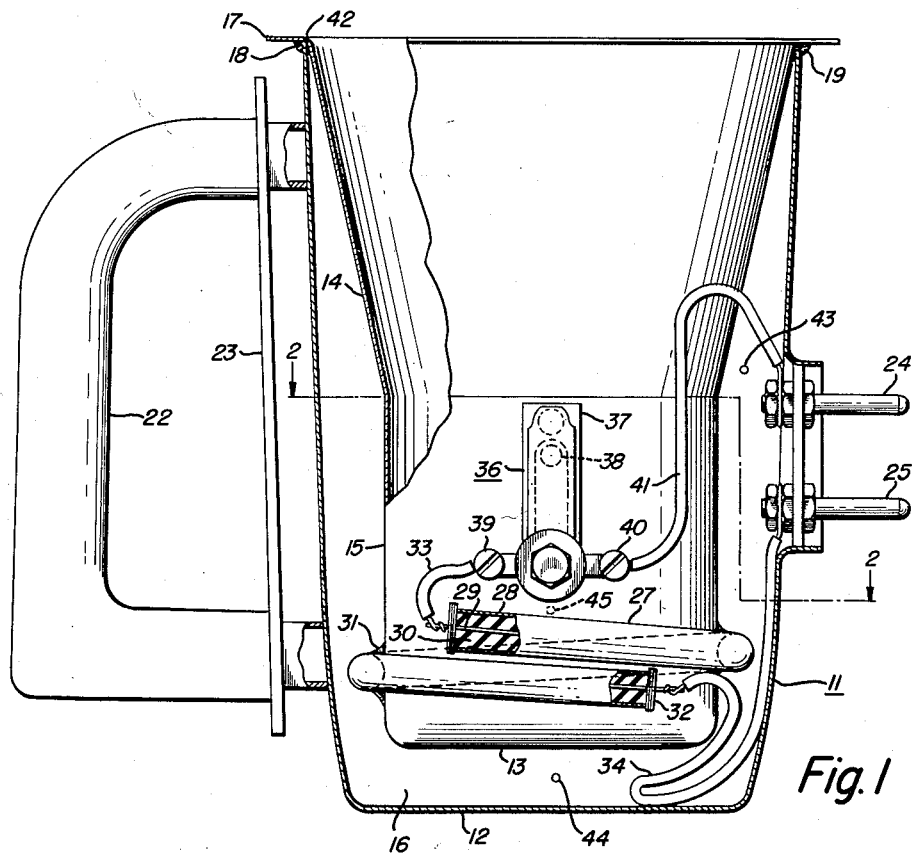
Figure 1 is a side view of the hot cup.
Figure 2:
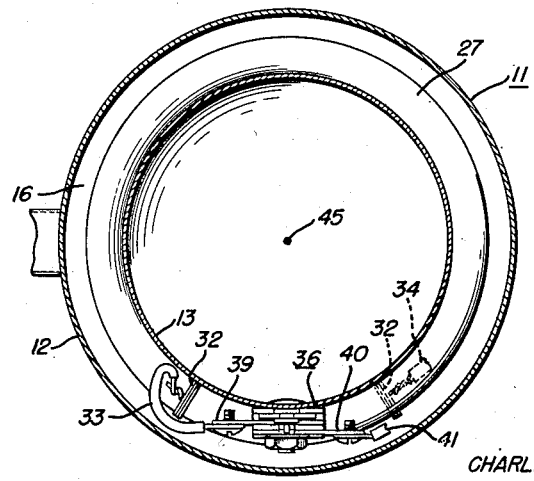
Figure 2 is a sectional view taken along the line 2—2 of Figure 1.

The hot cup is designated generally by the reference character 11 and includes an outer cup 12 and an inner cup 13. The outer cup 12 has been shown as generally cylindrical except near the bottom portion where there is a slight taper to a smaller diameter. The inner cup 13 has an upper portion 14 which is conically tapered and a lower portion 15 which is generally cylindrical. The inner cup 13 is smaller in diameter and shorter in height so that there is established an air space or void 16 between the two cups or shells. The inner cup 13 has a radially extending lip flange 17 at the top thereof and the upper edge 18 of the outer cup 12 contacts this lip flange 17. The two cups 12 and 13 are soldered together as at 19 at the junction of the upper edge 18 and the lip flange 17. This soldered joint makes a hermetically sealed void 16 so that the entire hot cup may be immersed in water for washing. A handle 22 is fastened to the outer cup 12 by any suitable means and a shield 23 may also be provided. In the present invention, this shield 23 is not necessary as a heat shield since the outer cup 12 does not reach high temperatures, however the shield generally carried advertising matter and thus would probably be retained. Electrical plug-in terminals 24 and 25 are provided extending through the outer cup 12 and are hermetically sealed in this outer cup. The terminals 24 and 25 permit the hot cup to be plugged into a convenient outlet for heating the soup or liquid within the hot cup.

An electrical tubular heater 27 is provided which extends about the periphery of the lower portion 15 and is sufficiently long to extend once around this periphery. The heater 27 is made of a copper tube 28 having an electrical resistance wire 29 therein and insulated from the tube by insulation 30. In the manufacture of these tubular heaters 27, the tube starts out by being a straight cylindrical tube. The resistance wire, whether straight or a small diameter coil, is next suspended by its ends inside the tube and co-axial therewith so that it does not touch the inner wall of the tube 28. A suitable insulating powder is next sifted down through the tube until it completely fills the air space between the tube 28 and the resistance wire 29. A suitable powder is magnesium oxide. This tube when filled with powder is then subjected to a compression force to make the powder practically a solid. In many cases, the tube is compressed radially to effect this compression. Since the electrical resistance wire 29 is co-axial with the tube, there is certain to be a good electrical insulation between the wire and the tube. However the powder being practically a solid has relatively good heat transfer characteristics and thus the heat generated by the resistance wire is readily transmitted to the tube 28. The insulation material being a solid has no air pockets which would act as a good thermal insulation. This metal-sheathed tubular heater 27 is next wrapped around the periphery of the lower portion 15 and fastened thereto in order to make a good metal to metal contact between the heater 27 and the inner cup 13. It has been found that silver solder makes a good metallic bond between the tube and the inner cup, however other suitable means such as brazing could be used. The silver solder is shown generally at the joint 31.

At the ends of the heater tube 27, insulating washers 32 are used and flexible leads 33 and 34 connect to the ends of the electrical resistance wire 29. A thermostat 36 is fastened directly to the inner cup 13 and is shown as being connected to the wall thereof just above the heater 27. This thermostat has a bimetallic element 37 which controls the opening and closing of contacts 38. The thermostat 36 has first and second terminals 39 and 40. The flexible lead 33 connects to the terminal 39 and a flexible lead 41 extends from the terminal 40 to the terminal 24. The flexible lead 34 is connected to the terminal 25. The thermostat 36 is arranged so that the contacts 38 are closed at room temperature and will open by movement of the bimetallic element 37 at about 190 degrees F. When the contacts 38 are closed, a closed circuit is established through the heater 27 from the terminal 24 to the terminal 25.

In the prior art type of hot cup a long sleeve type of heater which was insulated with mica from the inner cup was used surrounding the lower portion 15. This heater of course was connected to external terminals such as 24 and 25 so that it could be energized by electricity. As previously mentioned, this electrical resistance wire heater of the prior art type was not in metal to metal contact with the metal cup, rather it was insulated therefrom by mica which is a very good heat insulator. Attempts have been made to use a thermostat in this prior art type of hot cup with the thermostat controlling the flow of electrical energy to the heater; however, all were unsatisfactory, as recited above.

For comparison purposes, tests were run on a standard prior art hot cup without thermostat, and also run on a hot cup made in accordance with the instant invention.

Figure 3:
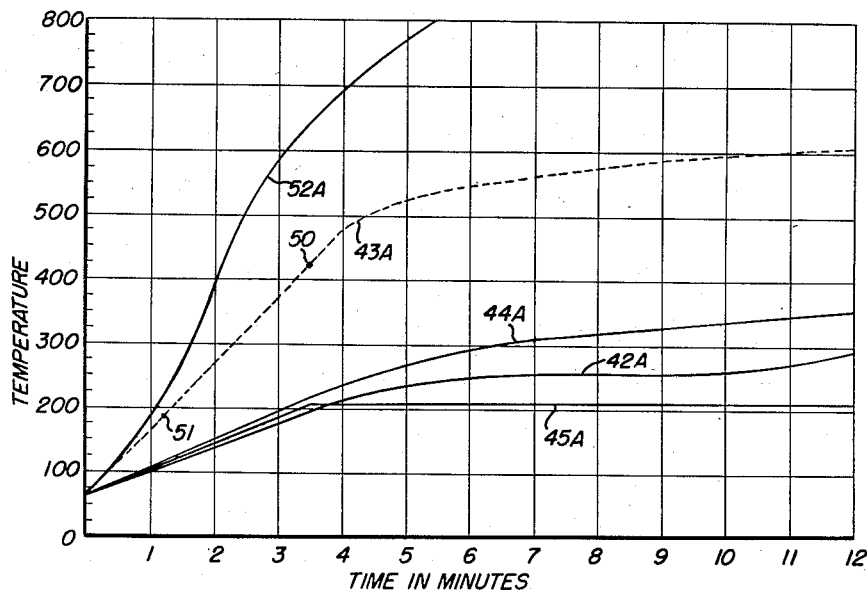
Figure 3 is a graph of temperatures obtained from the prior art hot cup.
Figure 4:
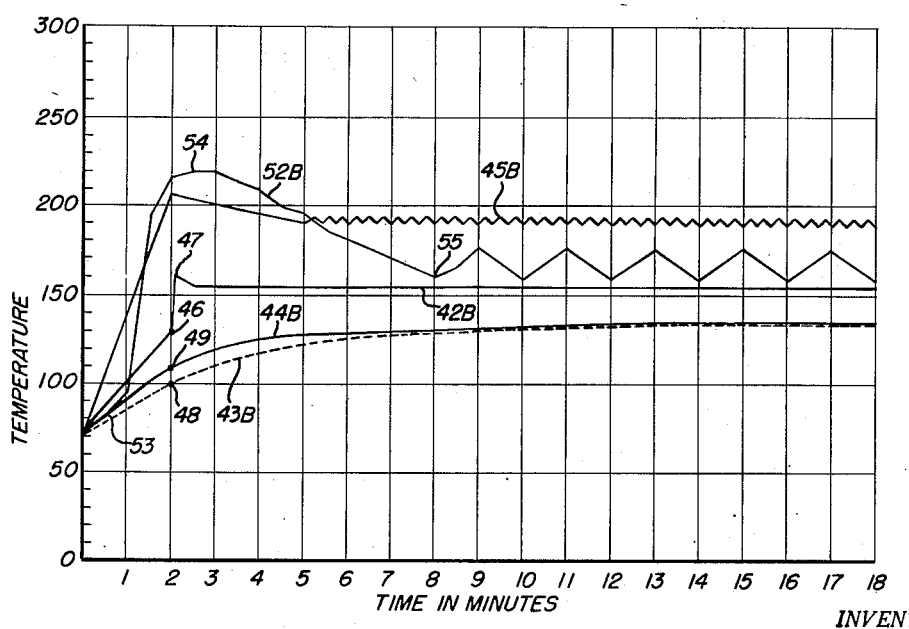
Figure 4 is a graph of temperatures obtained from the hot cup of the present invention.

Figure 3 shows a graph of temperature versus time for the prior art type of hot cup without a thermostat. Figure 4 shows a graph of temperature versus time obtained with the hot cup of the instant invention. Thermocouples were placed at four locations in each of the hot cups, the heaters energized and the temperatures observed over a period of time in both hot cups. A first thermocouple was pinched between the edges of the inner and outer cups at a point 42 at the solder joint 19. A second thermocouple was placed in the void 16 in spaced relation to both inner and outer cups at a point 43, 2 5/8 inches below the top of the hot cup; a third thermocouple was located in the void 16 in the center of the bottom at a point 44; and a fourth thermocouple was located in the water in the hot cup at a point 45, 1 1/4 inches from the bottom of the inner cup. Identical conditions and locations were used in the prior art type of hot cup without a thermostat, which was used for comparative test purposes. Curves 42A, 43A, 44A, and 45A were recorded and plotted for the prior art hot cup and appear on Figure 3. On the hot cup of the present invention, the temperatures and times were also recorded and are plotted as curves 42B, 43B, 44B, and 45B. The heater of the present invention was rated at 750 watts, whereas the heater of the prior art hot cup was rated at 720 watts. This is practically the same heater rating, yet it will be observed that the prior art hot cup took three and one-half minutes for the water to boil, whereas in the heater of the present invention, it took only two minutes for the same amount of water to boil. A most striking fact observed from these graphs is that in the prior art hot cup, the water temperature shown by the curve 45A was the lowest temperature of all those plotted, whereas for the graph of Figure 4 of the present invention, the water temperature 45B was higher than the other three curves. Observing Figure 4, it will be seen that the water reached the boiling temperature in two minutes as shown by curve 45B. The slight thermal lag in the thermostat 36 was responsible for permitting boiling even though the thermostat was set at 190 degrees. The thermostat cut in again at five minutes and then cycled on and off to keep the water at 190 degree temperature indefinitely. In observing Figure 3, the water took three and one-half minutes to boil as shown by curve 45A and then of course stayed constant at boiling temperature. The curves 42B, 43B and 44B of Figure 4 show that the temperature of various places in the hot cup of the present invention never reached the boiling point of water. At the end of two minutes when the water started boiling, the temperature of the upper lip 17 was only 130 degrees as shown by the point 46. The temperature rapidly climbed because of the bubbling of the water which rapidly transmitted heat to the upper lip 17. However this climb stopped at a point 47 and then leveled off at about 155 degrees. The curve 44B was the ambient temperature at the bottom center of the void 16 and it will be seen that at the two minute point indicated by reference character 49, the temperature in the void had reached only 110 degrees. Similarly, the thermocouple at the location 43 in the void 16 was registering only 100 degrees as seen by the reference character 48. The curves 43B and 44B show that the temperature within the void climbed to a maximum of only 135 degrees even though the test was continued for eighteen minutes.

This graph of Figure 4 shows that the hot cup of the present invention has definite merits as a safety feature, in that no exposed parts of the hot cup ever become hot enough to create a fire hazard.

The curve of Figure 3 which is for the prior art form of hot cup, shows that the temperatures in the void at locations 43 and 44 rapidly become exceedingly high. The thermostat 36 is placed very near the location 43. Upon observing the curve 43A, it will be noted that at the time of the boiling of the water, the temperature at location 43 was 430 degrees as shown by the point 50. It is thus believed clear that it would be impossible to mount a thermostat at this location 43 and have it satisfactorily control the action of the hot cup. If this thermostat were to be set at 190 degrees, for example, as in the present invention, the thermostat would open at about a point 51 which is one and one-fourth minutes. At a time of one and one-fourth minutes it will be observed that the water temperature on curve 45A was only 115 degrees which is definitely unsatisfactory as a serving temperature for soup.

The curve 44A shows that the temperature of the void at location 44 is also higher than the water temperature and thus likewise would be unsatisfactory for the location of a thermostat for control of a heater 27. The curve 42A shows that the temperature of the solder at joint 18 rapidly climbs to the 250 degree point and after about nine minutes starts to climb close to the 300 degree point. This would be about the melting point of solder and thus the hot cup could easily be destroyed if the hot cup were left plugged into the electrical outlet.

A curve 52A is plotted on Figure 3 and is the temperature at the location 42 during a dry test, that is, no water in the hot cup even at the start. A curve 52B is plotted on Figure 4 for similar test conditions on the hot cup of the present invention. The curve 52A on Figure 3 shows that the temperature of the top edge at the soldered joint 19 rapidly reaches 800 degrees F. This shows that the hot cup would be destroyed if inadvertently plugged into the convenience outlet when in dry condition. The curve 52B of Figure 4 shows the temperature conditions with the hot cup dry at the start. Electrical current was cut off in thirty-five seconds at a point 53. Because of the thermal lag in the metal of the hot cup, the temperature of the soldered joint 19 continued to rise but reached a maximum of only 220 degrees at a point 54 after two and one-half minutes. The current did not come on again until a point 55 at eight minutes. The thermostat then cycled on and off to keep the temperature of the entire hot cup between 160 degrees and 175 degrees.

A comparison of the curves in the graphs of Figures 3 and 4 will show that the prior art hot cup of Figure 3 presents a definite fire hazard, since the lip periphery of the cup reaches a dangerously high temperature on the liquid heating tests as well as the dry test. Many easily combustible materials of low kindling temperatures are apt to come in contact with hot cups where normally used, hence the hot cup of the present invention, with the continuously low operating temperature of the outer shell 12, has completely eliminated this fire hazard.

The curve of Figure 4 is thus believed to conclusively show that the metal-sheathed heater 27 which has a good metallic contact with the inner shell 13 is that which makes it feasible to use a thermostat 36 to control this heater 27. The temperature curves of Figure 3 are likewise believed to show that there is no location in the prior art hot cup which would be suitable for mounting a thermostat in order to control the mica insulated electrical sleeve type heater. Upon observation of Figure 1, it will be seen that the metallic bond between the heater 27 and the inner cup 13 is about one-third or one-fourth the entire peripheral area of the heater 27. Heat conducted and radiated by the resistance wire 29 is collected by the tube 28 and then is dissipated in two ways. It is radiated to the void 16 and it is conducted by the silver solder 31 to the inner cup 13. Radiation to the air in the void 16 may be considered as conduction of heat to the air and it will be noted that the thermal conductivity of copper is about sixteen thousand times as great as the thermal conductivity of air. Further, the thermal conductivity of copper is about one thousand times as great as the thermal conductivity of mica. This is believed to explain the difference in action between the prior art hot cup and the hot cup of the present invention. In the prior art hot cup with a mica insulation between the electrical heater and the inner cup, there was a great tendency for the heat to be radiated into the void rather than being transmitted to the inner cup. Actually in the prior art, the heat transmitted to the inner cup would have to be by radiation since the mica insulation would be a very poor conductor of heat. In the present invention, therefore, the heater is of high efficiency and the metallic bonding between the metal-sheathed heater 27 and the inner cup 13 is also a highly efficient method of transmitting heat to the inner cup. This is believed to be the reason why the water temperature as shown in curve 45B was higher than the temperatures of the soldered joint 19 or of the two locations in the void 16. It will be seen that since the void temperature at 43 and 44 did not rise above 135 degrees, then the temperature of the outer cup 12 would not rise above 135 degrees, and, because of radiation to the surrounding atmosphere and the inherent temperature differential, would actually be cooler than this. Thus, the shield 23 would really not be needed as a heat shield.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A heating device and container for a liquid, comprising, a cup-shaped metallic outer shell, a cup-shaped metallic inner shell smaller in cross sectional area than said outer shell, means for hermetically sealing together said shells in a nested condition only at the lip periphery of one of said shells to a wall of the other shell to maintain said shells in spaced condition throughout a majority of the lengths and bottoms thereof, a metallic tube of relatively good heat conductivity, a resistance wire element inside said tube, an electrical insulator having reasonably good heat transfer characteristics electrically insulating said tube and said wire element, said tube being wrapped around the periphery of the lower portion of said inner shell, electrical terminals extending through and hermetically sealed in said outer shell, a thermostat having off and on electrical conditions and connected in series circuit with said terminals and said resistance wire element, means for mounting said thermostat mounted in the void between said shells and in relatively good heat conductivity transfer relationship to the lower portion of said inner shell, and solid metal bonding between said tube and said inner shell throughout the majority of the length of said tube to establish a heat conductivity transfer therebetween such that the temperature of a liquid in said inner shell rises faster than the temperature of the ambient between said shells upon heating by said resistance element, and wherein the temperature of the lip periphery of said inner shell does not materially exceed the boiling point of said liquid when the inner shell does not contain said liquid, to thus avoid damage to the entire heating device and container.

2. A heating device and container for liquids, comprising, a cup-shaped metallic outer shell, a cup-shaped metallic inner shell smaller in height and cross-sectional area than said outer shell, means for hermetically sealing together said shells in a nested condition only at the lip periphery of said shells to maintian said shells in spaced condition throughout the lengths and bottoms thereof, a metallic tube of relatively good heat conductivity having a length greater than the periphery of the base of said inner shell, a resistance wire element inside said tube, an electrical insulator having relatively good heat transfer characteristics electrically insulating said tube and said wire element, said tube being wrapped around the periphery of the lower portion of said inner shell, electrical terminals extending through and hermetically sealed in said outer shell, a thermostat having off and on electrical conditions and connected in series circuit with said terminals and said resistance wire element, means for mounting said thermostat in the void between said shells and in relatively good heat conductivity transfer relationship to the lower portion of said inner shell, and solid metal bonding between said tube and said inner shell throughout the majority of the length of said tube sufficient to establish a heat conductivity transfer therebetween such that the temperature of a liquid in said inner shell rises faster than the temperature of the ambient between said shells upon heating by said resistance element, and wherein the temperature of the lip periphery of said inner shell does not materially exceed the boiling point of said liquid when the inner shell does not contain said liquid, to thus avoid damage to the entire heating device and container.

References Cited in the file of this patent

UNITED STATES PATENTS

| 920,906 | Bolling | May 11, 1909 |
|---|---|---|
| 1,046,103 | Parkhurst | Dec. 3, 1912 |
| 1,520,501 | Kohn | Dec. 23, 1924 |
| 1,895,212 | Smith | Jan. 24, 1933 |
| 2,223,780 | Carathers | Dec. 3, 1940 |
| 2,265,295 | Layton | Dec. 9, 1941 |
| 2,340,932 | Chalupa | Feb. 8, 1944 |
| 2,597,695 | Braski | May 20, 1952 |

FOREIGN PATENTS

| 981,652 | France | Jan. 17, 1951 |